June 19, 1934.  A. B. CLISSON  1,963,650
FRUIT AND VEGETABLE PACKING MACHINE
Filed April 21, 1930  4 Sheets-Sheet 1
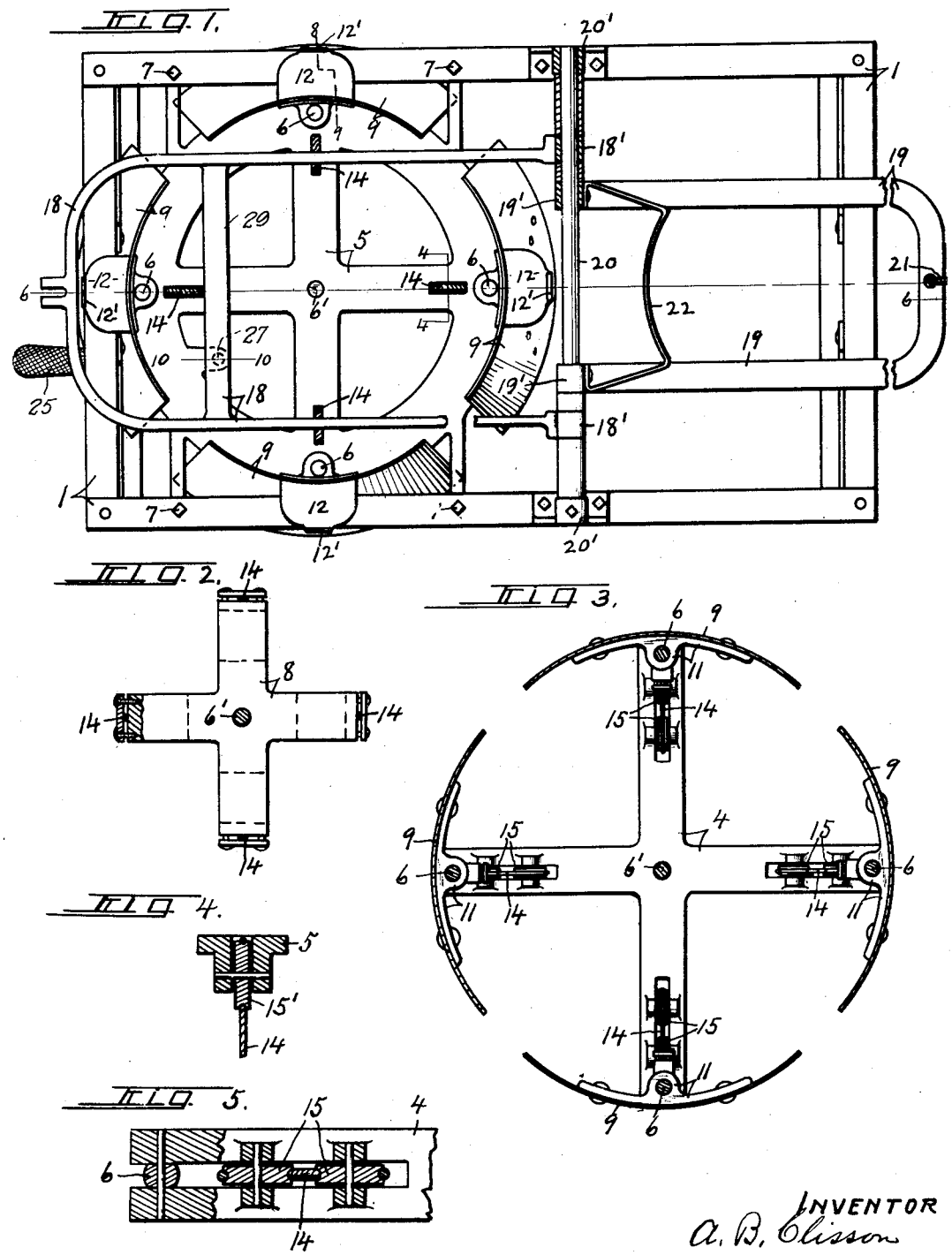
INVENTOR
A. B. Clisson
WITNESS
J. J. Mains
BY
Denison + Thompson
ATTORNEYS

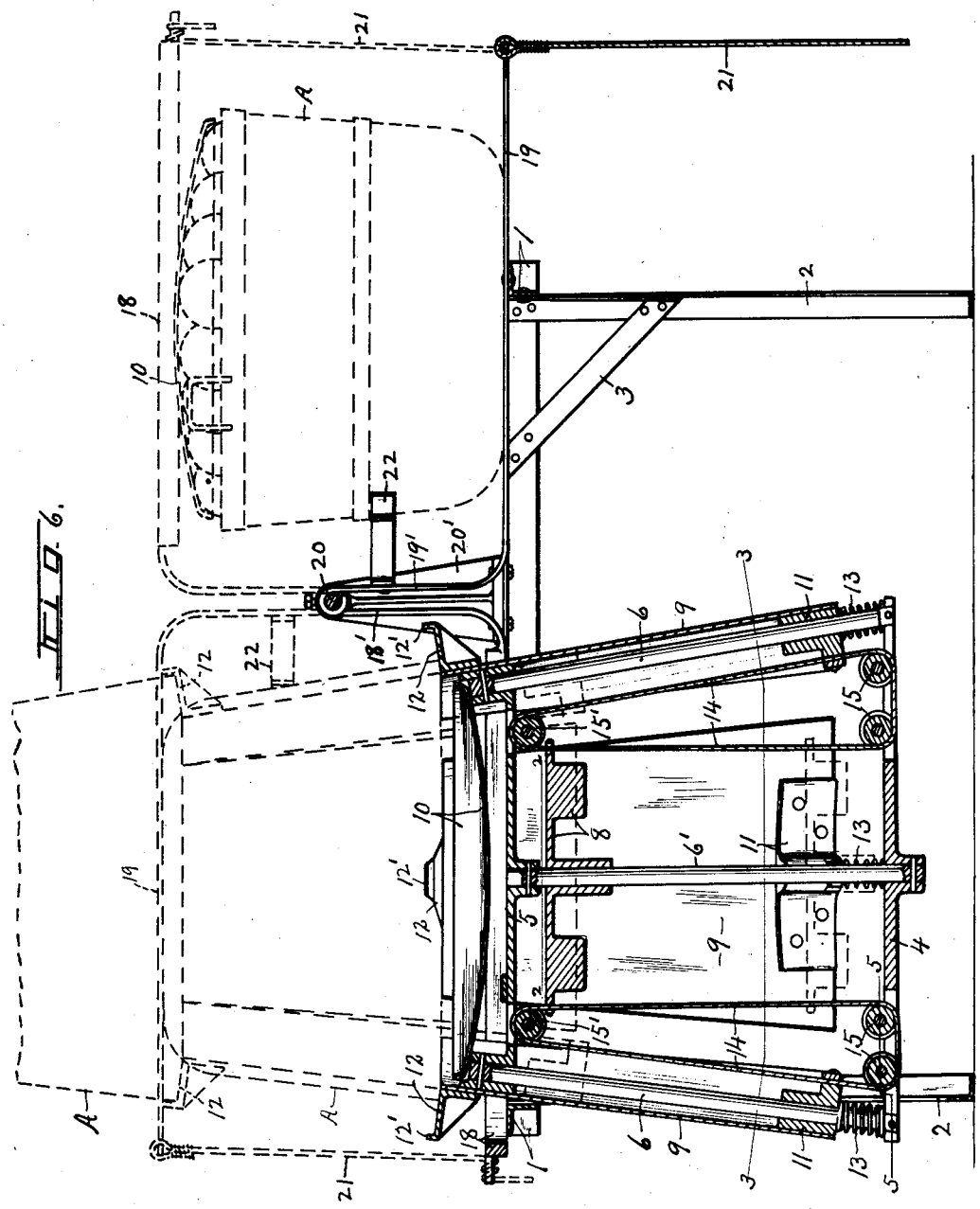

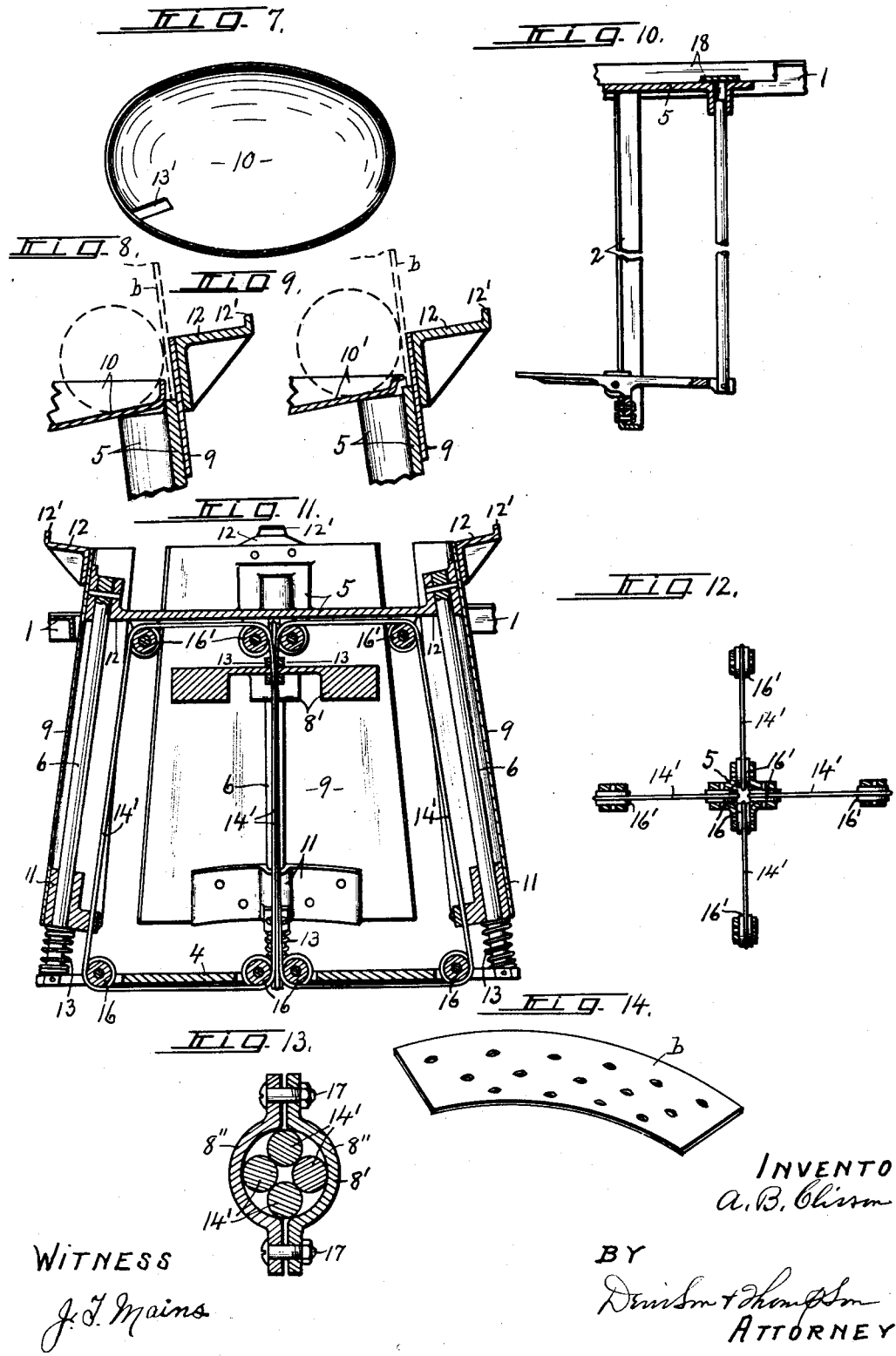

June 19, 1934. A. B. CLISSON 1,963,650
FRUIT AND VEGETABLE PACKING MACHINE
Filed April 21, 1930 4 Sheets-Sheet 4
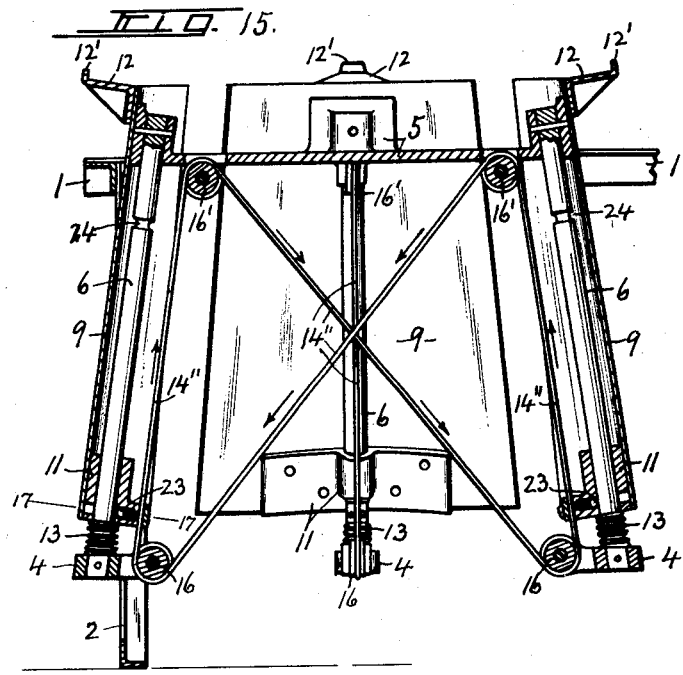
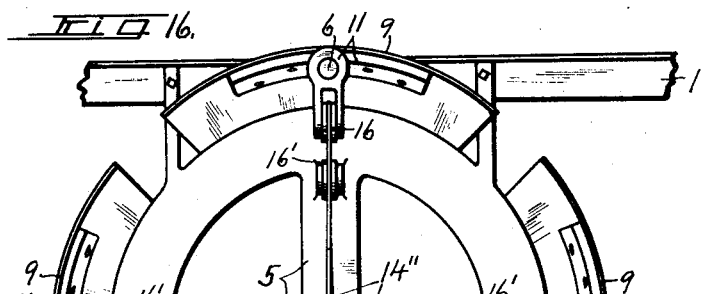
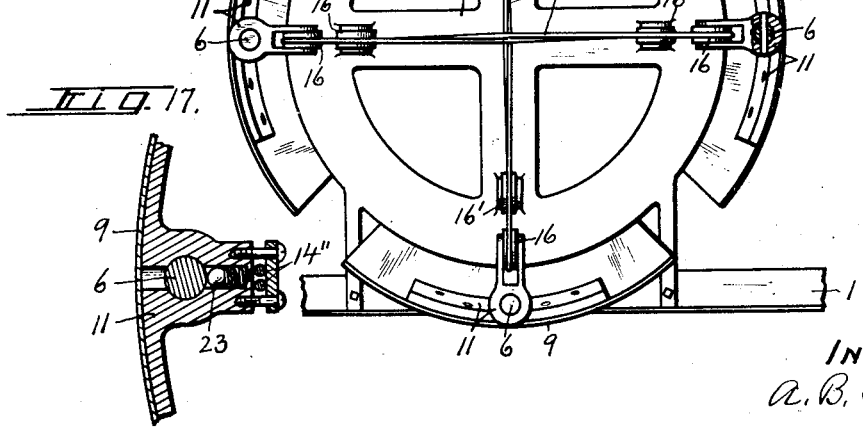
WITNESS
J. J. Mains
INVENTOR
A. B. Clisson
BY
Denison & Thompson
ATTORNEYS Patented June 19, 1934

1,963,650

UNITED STATES PATENT OFFICE 1,963,650

FRUIT AND VEGETABLE PACKING MACHINE

Albert B. Clisson, Syracuse, N. Y.; Flora S. Clisson administratrix of said Albert B. Clisson, deceased Application April 21, 1930, Serial No. 446,029

3 Claims. (Cl. 226—17)

This invention relates to a method of and apparatus for packing fruit, vegetables and analogous articles and is adapted to be used more particularly in connection with the turning device for the filled containers shown in my Patent No. 1,655,134, issued January 3, 1928.

The main object is to simplify the method of and apparatus for packing fruit and vegetables so that it may be accomplished more expeditiously and with less labor than has heretofore been practised and at the same time to greatly increase the output for a given period of time.

One of the specific objects is to provide means for temporarily confining a predetermined quantity of the articles upon a suitable support or facing member in such manner that the confining medium may be displaced downwardly and simultaneously replaced by another confining medium, preferably in the form of a packing receptacle, which, together with the articles therein, may be reverted and covered ready for storage or shipment.

Another object is to make the confining medium of approximately the same form and capacity as the receptacle or container into which the articles are to be packed.

A further object is to construct the confining medium in the form of segments arranged about the vertical axis of the facing member and to enable the segments to be moved across the marginal edge of said member from a position mainly above to a position mainly below the same so that when elevated they may be used for confining the articles on the facing member and when depressed serve to release the articles.

Another object is to utilize the inverted packing receptacle as a follower adapted to be moved downwardly over and around the articles as the segments are depressed for transferring the articles from the temporary confining medium into the packing receptacle.

Another object is to provide simple and efficient means for easily and quickly reverting the receptacle with the articles therein immediately following the depression of the temporary confining medium.

A further object is to provide means for counterbalancing the weight of the temporary confining medium so that it may be adjusted to its various positions with a minimum power.

A further object is to provide means for causing the segments of the confining shell to move in upwardly converging angles corresponding approximately to the interior taper of the inverted packing receptacle during the transfer of the articles from the confining medium to said receptacle.

Other objects and uses relating to specific parts of the apparatus will be brought out in the following description.

In the drawings:

Figure 1 is a top plan of a fruit and vegetable packing apparatus embodying the various features of my invention, a portion of one of the turning levers for the basket being broken away and one of the bearings for the supporting shaft for the turning levers being shown in section.

Figures 2 and 3 are horizontal detail sectional views taken respectively along the lines of 2—2 and 3—3, Figure 6.

Figure 4 is an enlarged detail sectional view taken in the plane of line 4—4, Figure 1.

Figure 5 is an enlarged horizontal detail sectional view taken in the plane of line 5—5, Figure 6.

Figure 6 is a longitudinal vertical sectional view of the machine taken in the plane of line 6—6, Figure 1, with the various moving parts in their normal positions, the dotted lines indicating the packing positions.

Figure 7 is a perspective view of the detached facing member upon which the articles are temporarily supported while being transferred to the packing receptacle.

Figures 8 and 9 are similar enlarged detail sectional views through the upper portion of one of the confining segments and adjacent portion of the guiding frame therefore, showing portions of modified forms of the facing member, taken along line 8—9, Figure 1.

Figure 10 is a vertical sectional view, partly broken away, taken in the plane of line 10—10, Figure 1, showing more particularly the means for agitating the supporting lever for the facing member and packing receptacle with the packed articles therein to cause said articles to settle into place before the receptacle is reverted or turned to its right side up position.

Figure 11 is a vertical sectional view of the temporary confining shell and its supporting frame similar to that shown at the lefthand of Figure 6 showing a modified means for counterbalancing the segmental shell.

Figures 12 and 13 are detail sectional views taken respectively in the planes of lines 12—12 and 13—13, Figure 11, Figure 13 being enlarged.

Figure 14 is a perspective view of an extended paper lining for the interior of the packing receptacle to prevent abrasion of the articles therein.

Figure 15 is a sectional view similar to Figure 11 showing a further modified means for transmitting motion from one segment to another as the segments are elevated and depressed.

Figure 16 is a top plan of the mechanism shown in Figure 15.

Figure 17 is an enlarged detail sectional view taken in the plane of line 17—17, Figure 15.

As illustrated this apparatus is adapted to be used for packing fruit, vegetables and analogous articles in standard forms of bushel baskets as A which are usually circular and frusto-conical with the bottom in the small end but obviously the same invention is broadly applicable for other uses, or rather for packing similar articles in receptacles of other forms.

The apparatus shown comprises a horizontal substantially rectangular frame 1 supported at a convenient elevation by legs 2 and braces 3 for receiving and supporting the various elements used in the temporary confining of the articles to be packed together with the means for reverting or turning the filled packing receptacle from its inverted position to a reverted position in a manner hereinafter described.

The temporary confining or packing mechanism proper involves the use of a supplemental frame mounted upon and forming a part of the main supporting frame and consisting, in this instance, of lower and upper substantially horizontal frame sections 4 and 5 bolted or otherwise secured in vertically spaced relation to and within the main frame 1 near one end thereof and connected by vertical guide rods 6 which serve to hold the sections 4 and 5 in spaced relation to each other and also serve as a means for guiding the segments of the confining shell in their upward and downward movements in a manner hereinafter more fully explained.

The upper section 5 of the supplemental frame is disposed in approximately the same horizontal plane as the top portion 1 of the main supporting frame and is secured thereto by bolts 7, shown in Figure 1, the major portion of said section 5 being circular and of slightly greater diameter than the interior diameter of the packing receptacle or basket A.

The lower section 4 of the supplemental frame is disposed in a horizontal plane a distance below the upper section 5 somewhat greater than the vertical depth of the interior of the receptacle A and preferably consists of a spider having radial arms of uniform radii greater than the radius of the circular portion of the top plate 5.

The guide rods 6 are secured at their lower ends to the outer ends of the arms of the web section 4 and extend upwardly therefrom in upwardly diverging angles relatively to the axis of the sections 4 and 5, the upper ends of said guide rods being secured to the upper head 5.

An additional guide rod 6' is secured at its lower and upper ends to the central portions of the lower and upper frame sections 4 and 5 coaxial therewith for guiding a vertically movable counterweight 8, hereinafter described.

The outer guide rods 6 are arranged in uniformly spaced relation around the axis of the central guide rod 6' so that the distances of their upper ends from said axis is slightly less than the interior radius of the open end of the basket A and it therefore follows that the lower ends of said guide rods will be a greater distance from said axis, the object of which is to support the guide rods in upwardly converging angles corresponding approximately to the taper of the interior of the basket A when the latter is inverted preparatory to filling the same from the underside upwardly with the articles to be packed.

These guide rods also serve to receive and support a corresponding number of, in this instance four, segments 9 of a segmental confining shell which is movable along the guide rods 6 from a position mainly above to a position mainly below the upper section 5 of the supplemental frame.

A facing member, consisting in this instance of a tray 10, is loosely and removably supported near its marginal edges upon the upper side or face of the marginal edges of the upper frame section 5 as shown more clearly in Figures 6 and 8 so as to allow the segments 9 to move upwardly and downwardly across the marginal edges thereof from the position shown by dotted lines to the position shown by full lines in Figure 6 and vice versa.

The lower ends of the segments 9 are provided with bearing members 11 having openings therethrough for receiving the guide rods 6, the upper ends of said segments being slidable across the marginal edge of the upper section 5.

These segments 9 converge upwardly at the same angle as and therefore parallel with their respective guide rods 6 and extend laterally equal distances from and at opposite sides of said guide rods with their adjacent edges in spaced relation to permit the passage of the turning levers, presently described, therethrough when in their depressed positions.

When the segments 9 are in their normal down positions their upper ends will still extend slightly above the upper faces of the upper frame section 5 and facing member 10 under which conditions the upper faces of the bearings 11 will be disposed a distance below the lower face of the overlying portions of the upper section 5 slightly greater than the interior depth of the inverted basket A so that when the segments are raised to their extreme upper positions the form and capacity of the portion of the segmental shell above the tray 10 will be approximately equal to the form and capacity of the interior of the basket as will be hereinafter more fully explained.

The upper ends of the segments 9 are provided with lateral offset shoulders or seats 12 in approximately the horizontal plane of the upper edges thereof for receiving and supporting the marginal edge of the open end of the basket when the segments are in their extreme upper positions and also during the simultaneous lowering of the segments and basket when transferring the articles from the confining shell into the inverted basket thereon, the outer edges of said seats being provided with upturned flanges 12' to hold the basket against lateral displacement.

It is, of course, evident that when the segments 9 are moved upwardly and downwardly along their respective guide rods 6 they will also be moved radially toward and from each other, thereby contracting the segmental shell when in its up position and correspondingly expanding the same when in its down position.

It therefore becomes necessary to make the seats 12 for the basket of sufficient width to remain in engagement with the marginal edge of the basket when in both its upper and lower positions.

That is, the radii of the inner edges of the flanges 12 are slightly less than the radius of the marginal edge of the basket while the radii of the shoulders 12' will be slightly greater than the diameter of the marginal edge of the basket, thus allowing the marginal edge of the basket to slide radially on the seats 12 as the segments 9 are raised and lowered to and from their article confining position.

Suitable buffers 13 encircle the lower ends of the guide rods 6 between the lower frame section 4 and bearing members 11 to relieve the segments 9 and basket carried thereby from excessive shock when approaching the limit of downward movement.

The facing member or tray 10 is preferably concavo-convex in cross section and supported on the upper face of the upper frame section 5 with its concave side uppermost for receiving a layer of selected fruit or vegetables, said facing being provided with a marginal flange for retaining the articles therein.

This tray may be provided near its marginal edge with a recess 13' adapted to receive a stop block or similar abutment against which the first one of the outer row of the articles may be held while placing the remaining articles in the tray in systematic order.

*Counterbalancing means*

As shown in Figures 1 to 5 inclusive, each segment 9 has associated therewith an endless belt 14 mounted upon lower and upper sheaves 15 and 15' which in turn are journaled in bearings upon the lower and upper frame sections 4 and 5 for supporting the belt in a radial plane passing through the central guide rod 6' and corresponding outer guide rod 6.

The sheaves for each belt are also arranged so that the outer side of the belt will be disposed in a plane substantially parallel with the adjacent guide rod 6 while the inner side of the same belt will be disposed in a vertical plane substantially parallel with the central guide rod 6'.

The inner sides of the several belts are secured to the adjacent portions of the marginal edge of the counterweight 8 while the outer portions of the belts are secured to the inner sides of the bearing members 11, the counterweight 8 acting upon the inner sides of the belts 14 being arranged to substantially counterbalance the weight of the segmental shell or its four segments 9 and including the bearing members 11 and flanges 12 and together with the belts constitute a connection between the segments to cause the latter to move in unison.

The counterweight 8, bearing members 11 and belts 14 are arranged in such manner that when the segments 9 and their bearing members 11 are in their lowermost positions the counterweight will be in its uppermost position in a plane directly beneath the upper frame member 5 and sheaves 15' and it therefore follows that when it is desired to raise the segmental shell to the position shown by dotted lines in Figure 6 it may be accomplished with a minimum lifting power by reason of the counterbalance 8.

On the other hand when the segmental shell is elevated and filled to capacity with the fruit or other vegetables the weight of the inverted basket resting upon the ledges 12 will wholly or partially overcome the counterbalancing weight 8 and thus permit the basket and its supporting segments to be rapidly depressed by hand for transferring the articles previously confined within the segmental shell into the inverted basket A after which the loaded basket with the facing member 10 will be reverted to the position shown by dotted lines to the right of Figure 6.

In the modified counterbalancing device shown in Figures 11, 12 and 13, the central guide rod 6' is omitted and the simultaneous raising or lowering of the shell segments 9 is controlled by a plurality of, in this instance four, endless belts 14', one for each pair of the segments, each belt being guided by a pair of sheaves 16 on the lower frame section 4 and by an additional pair of sheaves 16' on the upper frame section 5.

The innermost sheaves 16 and 16' of the lower and upper sets are brought into close relation for the purpose of bunching the inner sides of all four belts closely together and permitting the counterweight 8' to be clamped thereto as shown more clearly in Figures 11 and 13.

That is, the clamping means is split to form opposed sections 8'' tightly clamped to the enclosed portions of the belts 14' by bolts 17 to hold the counterweight 8' and enclosed portions of the belts against relative endwise movement, it being understood that the outer portions of the belts will be secured to the bearing members 11 on the lower ends of the segments 9 whereby all four of the segments will be raised or lowered simultaneously aided by the counterweight 8'.

In Figures 15, 16 and 17 the bearing members 11 of each pair of diametrically opposite segments 9 are connected by an endless belt 14'' having its inner sides crossing each other to cause the corresponding segments to move simultaneously in the same direction.

It will be observed upon reference to Figures 8 and 9 that the outside diameters of the trays 10 and 10' are slightly less than the inner diameters of the upper end of the segmental shell when the latter is in its extreme down position to permit the insertion of the lower edge of a paper or equivalent lining member b in the intervening space.

This paper liner b is preferably made of sufficient length and width to extend entirely around the interior of the basket A throughout the major portion of its height to protect the articles from abrasion by the walls of the basket and for this purpose is made arcuate to conform to the different diameters of the basket at the top and bottom, the liner being usually furnished in flat form to be inserted within the upper end of the segmental shell around the inner walls thereof when the shell is raised for receiving the articles to be packed.

That is, when the tray 10 or 10' is placed in operative position upon the upper face of the top section 5 and the segmental shell is moved upwardly to the position shown by dotted lines in Figure 6, the lining b may be placed in operative position against the inner faces of the segments of the shell with its lower edge resting upon the upper marginal edge of the top section 5 as shown by dotted lines in Figures 8 and 9 so that the upwardly projecting portion of the segmental lining therein may then be filled with the fruit or vegetables whereupon the basket is placed in position with its marginal rim resting upon the seats 12 and is then forced downwardly to effect a similar corresponding movement of the segments 9 for transferring the articles therefrom to the interior of the basket which, together with the supporting tray 10, is reverted to the position shown by dotted lines at the right hand of Figure 6.

Turning device

The means for reverting or turning the basket with the fruit therein from its inverted position to its upright position is similar to that set forth in my patent previously referred to and comprises a pair of U-shaped levers 18 and 19 having their open ends provided with offset extensions 18′ and 19′ hinged to a suitable cross shaft 20, which, in turn, is mounted upon opposite side brackets 20′ projecting upwardly from the frame 1 as shown in Figures 1 and 6.

The cross shaft 20 is supported in a plane a distance above the upper face of the frame 1 corresponding approximately to one-half of the vertical height of the filled basket, together with the tray 10 while the offset extensions 18′ and 19′ of the levers 18 and 19 are disposed at substantially right angles to the main portions of said levers to extend from the shaft 20 to the upper surface of the frame 1 so that the main portions of the levers may normally rest in a horizontal position upon the top of the frame with their extensions 18′ and 19′ projecting upwardly therefrom.

The frame 1 extends entirely around the segmental shell in about the same horizontal plane as the top section 5 and also projects some distance laterally beyond the segmental shell and frame section 5 to form a support for the levers 18 and 19 when in their normal positions, the shaft 20 being located at one end of but in more or less close proximity to the frame section 5 and adjacent portions of the segmental shell directly over the laterally projecting extension of the frame so that the offset portions 18′ and 19′ will normally be disposed in approximately the vertical plane of the cross shaft 20 and therefore at the corresponding end of the frame section 5 and adjacent portions of the segmental shell.

Under these conditions the main portions of the levers 18 and 19 will normally extend horizontally in opposite directions from the vertical plane of the cross shaft 20, as shown by full lines in Figure 6.

The opposite arms of the lever 18 normally extend across and upon the upper face of the frame section 5 equal distances at opposite sides of the center thereof and also directly under the tray 10, and through the spaces between the adjacent ends of the segments 9 as shown more clearly in Figures 1 and 6.

In other words the lever 18 normally extends beyond opposite ends of the frame section 5 and adjacent portions of the segments 9 and has its opposite arms normally extending through and movable in the spaces between the segments and directly under the adjacent portions of the tray 10 to allow said segments to be moved vertically without frictional contact with the lever, particularly when transferring the articles from the shell to the basket.

It will be noted upon reference to Figure 6 that the lever 18 is normally disposed in a horizontal plane below the ledges 12 and bottom of the tray 10, the object of which is to permit the shell, when elevated, to be filled with fruit or other articles without contact of said articles with the lever and at the same time to permit the lever 18, together with the tray 10 and loaded basket, to be rocked upwardly and laterally about the axis of the shaft 20 after the articles have been transferred from the temporary confining shell to the basket in a manner presently described.

The lever 19 is of substantially the same length as the lever 18 and is adapted to be rocked from its normal horizontal position, shown by full lines in Figure 19, to a position directly over said lever 18 and into engagement with the bottom of the inverted basket after said basket and shell segments have been depressed for transferring the articles from the shell to the basket.

In order that the inverted loaded basket, together with the tray 10 may be more conveniently reverted or turned right side up as shown by dotted lines at the right of Figure 6, the lever 19 will be rocked from the position shown by full lines in Figure 6 to the position shown by dotted lines in the same figure and its free end will then be connected to the corresponding free end of the lever 18 by means of a cable 21 or equivalent connecting means which serves to hold the levers in firm engagement with opposite ends of the loaded basket including the tray 10.

The connected levers 18 and 19 together with the interposed loaded basket A and its tray 10 are then rocked upwardly and laterally about the axis of the shaft 20 from a position directly over the upper end of the segmental shell to the right hand side thereof as shown in Figure 6 or until the lever 19 is brought to rest upon the upper surface of the frame 1.

The offset portion 19′ of the lever 19 is provided with a laterally projecting brace 22 having a concave outer face for engaging the adjacent side of the basket and holding the latter aginst lateral movement during the turning operation.

Suitable means is provided for detaining the shell segments 9 in their elevated positions against accidental downward displacement and for this purpose the bearing members 11 are provided with spring actuated detents 23 adapted to enter annular grooves 24 in the upper portions of the guide rods 6 as shown more clearly in Figures 15 and 17 which also shows the means for clamping the belts 14, 14′ and 14″ to the bearing members 11.

Agitating device

After the first layer of the fruit is placed in the tray 10 and the segmental shell has been elevated and filled with the fruit or other articles to be packed it may be necessary or desirable to agitate or vibrate the supporting tray 10 for the confined articles to cause them to settle more or less within the confining shell so that additional articles may be placed in said shell for completely filling the portion thereof extending above the tray 10 to conform to the capacity of the basket A and for this purpose a pedal lever 25 is pivoted intermediate its ends at 26 to the front end of the frame 1 so that its pedal may project outwardly therefrom, the inner end of the lever being provided with an upwardly projecting rod 27 pivoted thereto and having its upper end guided in an opening 28 in the upper frame section 5 for engagement with a cross bar 29 on the turning lever 18 as shown more clearly in Figures 1 and 10.

The cross bar 29 is rigidly secured to the opposite arms of the turning lever 18 to normally ride across the upper end of the guide opening 28 so that when the paddle lever 25 is depressed the rod 27 will engage the cross bar 29 and thereby lift the turning lever 18 which in turn will engage the underside of the tray 10 and cause a corresponding lifting movement of the tray with the confined articles thereon, this operation being repeated at short intervals to cause the settling of the articles into more compact space within the confining shell, whereupon, if the settling is appreciable, additional articles may be placed within the shell until the latter is filled ready for the turning operation.

*Operation*

Assuming that the various moving parts are in their normal positions as shown by full lines in the drawings the tray 10 will first be placed upon the top section 5 of the frame and a layer of the articles to be packed placed thereon in a manner wellknown to those skilled in this art.

The segments 9 are then moved upwardly across the marginal edges of the tray 10 to the position shown by dotted lines in Figure 6 after which the portions of the segmental shell projecting above the tray 10 will be filled with the articles to be packed.

Or, if desired, the liner b may be placed in operative position within the upwardly projecting ends of the segments before the articles are introduced into the confining shell.

The basket A is then placed in inverted position with its rim resting upon the ledges 12 whereupon downward pressure upon the basket will displace the segments 9 downwardly and simultaneously cause the released articles to be confined within the basket.

The lever 19 is then rocked upwardly and laterally over the bottom of the basket to the position shown by dotted lines in Figure 6 and its free end connected to the corresponding end of the underlying lever 18 by means of the cable 21 or equivalent fastening device, it being understood that during this movement of the lever 19 its bracket 22 will be brought into engagement with the adjacent side of the basket.

When the two levers 18 and 19 are connected by the cable in the manner described both levers with the filled basket between them, together with the tray 10 will be rocked upwardly and laterally until the lever 19 again rests upon the underlying portion of the frame 1 with the filled basket resting thereon.

The cable 21 is then released from the lever 18 and the latter returned to its normal position upon the lefthand end of the frame 1, whereupon the tray 10 may be removed for reuse upon the upper face of the frame section 5 as shown by full lines in Figure 6.

Or, if the tray is made of pasteboard or equivalent cheap material, it may be left upon the articles within the basket and held in place by a suitable fastener ready for storage or transportation.

The construction and operation shown and described is particularly simple, practical and highly efficient in carrying out the objects of the invention but obviously various changes may be made in the detail construction without departing from the spirit of this invention.

What I claim is:

1. An apparatus for packing fruit and vegetable articles, comprising a facing member support, a segmental shell having its segments movable across the marginal edges of a facing member on the support to receive and temporarily confine the articles when elevated and to release said articles when depressed to their article releasing position, and means movable in the spaces between the segments for displacing and inverting the facing member.

2. In an apparatus for packing fruit and vegetable articles, a facing member support, upwardly converging faced guides arranged below a facing member on the support, a plurality of upwardly converging members for receiving and confining articles placed therein when elevated and for releasing said articles when lowered, a counterweight, and cable connections between said counterweight and segments.

3. A fruit packer comprising a facing member support, a plurality of fixed guides arranged below a facing member on the support and converging upwardly, a confining means embodying a plurality of segments each of which has guiding means at the lower end thereof movable upwardly and downwardly on one of the guides, and means connecting the segments for simultaneous movement upwardly and downwardly on the guides.

ALBERT B. CLISSON.